United States Patent [19]

Wilcox et al.

[11] Patent Number: 4,730,835
[45] Date of Patent: Mar. 15, 1988

[54] ANTI-EXTRUSION SEAL ELEMENT

[75] Inventors: Raymond K. Wilcox, Dallas; Gary L. Harris, Houston, both of Tex.

[73] Assignee: Baker Oil Tools, Inc., Orange, Calif.

[21] Appl. No.: 912,253

[22] Filed: Sep. 29, 1986

[51] Int. Cl.[4] .................. F16J 15/28; E21B 33/128
[52] U.S. Cl. .................................. 277/230; 277/125;
277/188 A; 277/117; 166/120; 166/134; 166/196

[58] Field of Search ............ 277/104, 105, 115, 116.2, 277/117, 125, 186, 188 A, 188 R, 230, 227; 166/120, 123, 134, 138, 196

[56] References Cited

U.S. PATENT DOCUMENTS

| 3,033,722 | 5/1962 | Goodloe | 277/230 X |
| 3,554,280 | 1/1971 | Tucker | 277/125 X |
| 4,289,200 | 9/1981 | Fisher | 166/120 |
| 4,310,163 | 1/1982 | Pippert | 277/230 X |
| 4,326,588 | 4/1982 | McStravick | 166/134 X |
| 4,349,205 | 9/1982 | McGee et al. | 277/188 A |
| 4,441,721 | 4/1984 | Harris et al. | 277/125 X |
| 4,505,332 | 3/1985 | Mills et al. | 166/120 |
| 4,611,658 | 9/1986 | Salerni et al. | 277/230 X |

Primary Examiner—Donald Watkins
Attorney, Agent, or Firm—Norvell & Associates

[57] ABSTRACT

A sealing assembly for effecting the sealing of an annulus between two telescopically related tubular conduits, of the type employed in subterranean wells, is achieved by utilizing annular seal backup elements dieformed from a knitted wire mesh by two successive dieforming steps. In the first dieforming, the knitted mesh backup element is formed to an external diameter equal to or preferably exceeding the maximum diameter that will be required for the backup member to assume when expanded into engagement with the outer wall of the annulus to be sealed. The second dieforming operation reduces the external diameter of the annular knitted mesh seal backup element to a dimension less than the outer wall of the annulus to be sealed, thus permitting convenient assembly and run-in of the sealing assemblage. The two step dieforming operation significantly reduces the amount of axial compressive force required to expand the sealing elements and the seal backup members to their sealed position.

12 Claims, 6 Drawing Figures

ANTI-EXTRUSION SEAL ELEMENT

BACKGROUND OF THE INVENTION

1. Field of the Invention

The invention relates to a seal assembly of the type employed for sealing an annulus defined between two telescopingly concentric conduits in a subterranean well, and particularly to an improved seal backup element for preventing extrusion of the sealing elements and method of fabricating same.

2. History of the Prior Art

Radially expandible annulus seals are employed in practically every subterranean well. Normally, the purpose of the seal is to seal the annulus defined between the bore of the well casing and the exterior of a tubing string extending down to the production formations. Such annulus sealing assemblies are an important part of packers, hangers, bridge plugs and the like. In many wells, the environment in which the annulus sealing assembly has to operate is not extreme, permitting the sealing elements to be formed from an elastomeric material. In other wells, and particularly steam injection wells wherein steam is transmitted into the well by one or more tubing strings to lower the viscosity of the hydrocarbons contained in the production formations, the environmental conditions can be quite extreme, involving temperatures in excess of 400° F. and high pressures. Sealing assemblies for this type of well have generally utilized non-elastomeric materials such as sealing elements formed primarily from graphite which, of course, is not elastically deformable.

Regardless of the environmental conditions to which the sealing assembly is exposed, a common problem has been encountered in that the seal assembly is generally energized through the application of a substantial axial compressive force on the sealing elements, thus forcing such sealing elements to expand radially outwardly into sealing engagement with the wall of the annulus in which they are disposed. Whether the sealing elements are formed from elastomeric material or a nonresilient deformable material, such as a graphite composition, the sealing elements are subject to extrusion axially around the backup elements by which the compressive force is applied to a single sealing element or an axial stack of sealing elements. Such extrusion is highly undesirable in that it reduces the physical volume of the sealing elements and thus reduces the compressive forces acting on such sealing elements. Hence, the energizing mechanism for such sealing assemblies must be capable of maintaining a substantially constant compressive force on the sealing elements, irrespective of the fact that the volume of the sealing elements may be continually shrinking due to extrusion.

It is impractical to use a close fitting solid metallic backup element to minimize the extrusion of the material of the sealing element. The most popular form of seal backup element in recent years has been an annular mass of wire mesh which is originally knitted as a tube or stocking and then is dieformed into the desired annular configuration, which generally has a parallelogram cross section. The knitted wire mesh annular sealing elements are dieformed to a maximum dimension permitting them to be freely inserted within the annulus to be sealed. The subsequent application of an axial compressive force to such wire mesh backup elements results in not only the radial expansion of the sealing elements, but a radially outward deformation of the annular wire mesh backup elements into snug engagement with the bore of the outer conduit defining the annulus. A substantial force, however, is required to effect such outward deformation of the wire mesh backup element and this requires that the energizing elements for the seal be fabricated of stronger and hence, heavier individual elements. Obviously, a reduction in the force required to expand the wire mesh backup elements into snug engagement with the bore of the outer conduit defining the annulus to be sealed would be highly desirable in any type of sealing assembly.

SUMMARY OF THE INVENTION

In accordance with this invention, the annular knitted wire mesh backup elements utilized in seal assemblage for annulus found in subterranean wells are first dieformed into a generally parallelogram cross-sectional configuration wherein the maximum diameter of the annular configuration is equal to or exceeds the maximum diameter of the annulus within which the seal assembly is to be utilized. Following this initial dieforming operation, the dieformed annular wire mesh mesh is subjected to a second dieforming operation wherein the maximum diameter is reduced to a dimension significantly less than the internal diameter of the bore of the outer conduit defining the well annulus to be sealed. The small diameter of the double dieformed annular mesh backup element is maintained equal to or slightly greater than the small diameter of the annulus to be sealed. With this configuration, the double dieformed annular mesh backup element may be freely inserted in the seal assembly and in the annulus to be sealed. The application of a compressive force to the annular mesh backup member, which is transmitted to the sealing elements, causes a radial expansion of the sealing elements into sealing engagement with the walls of the annulus, and concurrently produces a radial expansion of the annular mesh backup elements. The force required to effect this latter expansion is, however, substantially less than that required for annular mesh backup members fabricated by a single dieforming operation.

The reason for such substantial reduction in force required to expand the annular mesh backup members into snug engagement with the outer bore wall of the annulus to be sealed is believed to reside in the memory of the metallic material forming the annular mesh backup members. Having once been deformed to a diameter greater than that required for snugly engaging the bore of the annulus, and then reduced to a smaller assembly diameter, the elastic memory of the metallic material permits it to be more readily expanded into snug engagement with the walls of the annulus to be sealed through the application of a smaller axial force to the seal assembly through the double dieformed annular mesh backup element.

Further advantages of the invention will become readily apparent to those skilled in the art from the following detailed description, taken in conjunction with the annexed sheets of drawings, on which are shown several preferred embodiments of the invention.

BRIEF DESCRIPTION OF DRAWINGS

FIG. 1 illustrates the assembly or nonexpanded position of the seal assembly.

FIG. 3 shows the elements of the seal assembly in their initially assembled or non-expanded condition.

DESCRIPTION OF PREFERRED EMBODIMENTS

Figure 1:
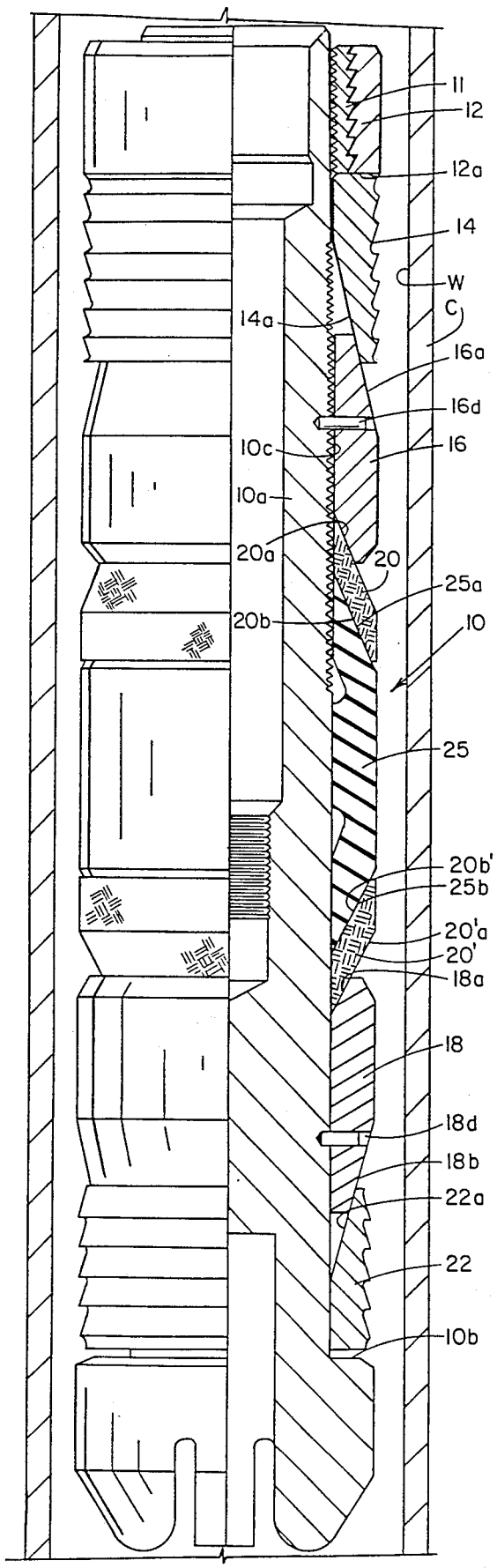
FIG. 1 is a schematic perspective view of a seal assembly for a bridge plug utilizing a single elastomeric sealing element which is backed up on both axial endfaces by double dieformed annular wire mesh members fabricated in accordance with this invention.
Figure 2:
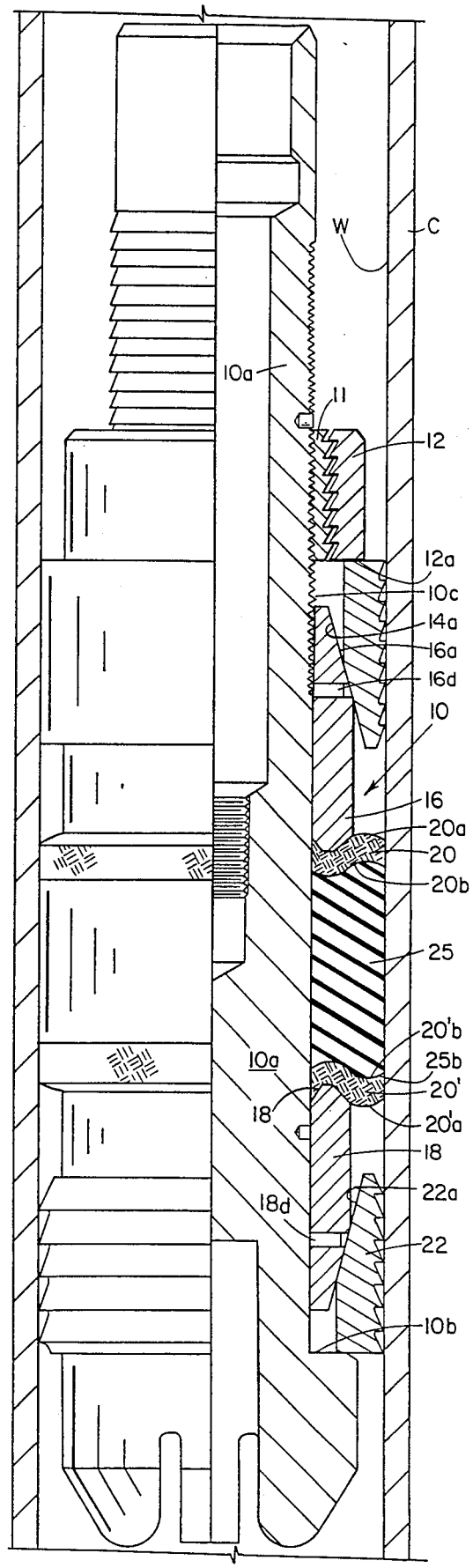
FIG. 2 is a view similar to FIG. 1 but illustrating the expanded sealing configuration of the seal assembly as a result of the application of an axial compressive force to the seal assembly.

Referring to FIGS. 1 and 2, there is schematically illustrated a conventional seal assembly of the type employed in packers, bridge plugs, or the like wherein a single elastomeric seal element is radially expanded through the application of axial compressive forces to effect a seal with a surrounding conduit bore. Thus, the seal assembly 10 embodies a seal mounting body 10a having at one end an upwardly facing radial shoulder 10b and at the other end being provided with axially extending wicker threads 10c which cooperate with a body lock ring 11 which is mounted within a body lock support ring 12 in conventional fashion. As is well known to those skilled in the art, upward movement of the seal mounting body 10a relative to the body lock support ring 12 can be produced either mechanically or hydraulically by actuating mechanisms well known in the art. In any event, the radial shoulder 10a can be moved relatively toward the downwardly facing shoulder 12a provided on the body lock support ring. In between these shoulders are successively mounted conventional upper slips 14 having an inclined bottom surface 14a which is cooperable with a similarly inclined upper surface 16a of an annular cone 16. The cone 16 at its lower end abuts an inner portion 20a of a generally parallelogram cross section, upper seal backup ring 20 which forms the subject of this invention and will be described in more detail later. The downwardly facing inclined surface 20b of the seal backup ring is in abutment with a similarly inclined top surface 25a of an annular elastomeric packing element 25.

The lower inclined surface 25b of the annular elastomeric packing element 25 is in abutment with a similarly inclined upper surface 20'b of a second or lower seal backup ring 20' which is substantially identical to the upper seal backup ring 20 except that its cross section is a mirror image reversal of the cross section of the upper seal backup ring 20. The lower or downwardly facing inclined surface 20'a of the lower seal backup ring 20' is in abutment with a similarly inclined upwardly facing surface 18a of a lower cone 18. Lower cone 18 has an inclined lower surface 18b engaging a correspondingly inclined bottom surface 22a on the lower slips 22.

Lower slip 22 abuts the upwardly facing radial surface 10b provided on the seal mounting body 10.

As schematically shown in FIG. 2, when the seal mounting body 10 is moved upwardly relative to the body lock support ring 12, an axial compression force is applied to the annular elastomeric seal element 25 through each of the seal backup rings 20 and 20'. This effects an outward expansion of both the annular elastomeric seal element 25 and the seal backup rings 20 and 20' so that such elements assume the expanded positions illustrated in FIG. 2 wherein they are snugly engaged with the bore wall W of a surrounding well conduit C.

Upper cone 16 is held in its originally assembled position shown in FIG. 1 by a shear pin 16d and lower cone element 18 is similarly held in its originally assembled position by the shear pin 18d. Such pins are, of course, sheared through the application of an axial compressive force to the seal assembly.

Figure 5:
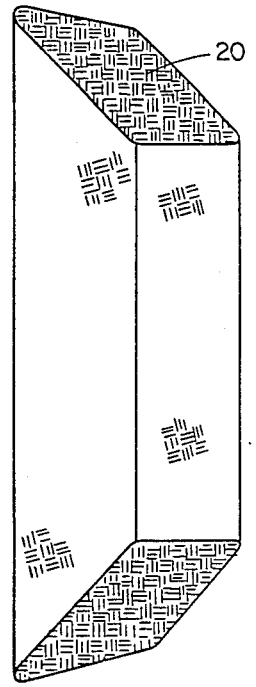
FIG. 5 is a sectional view of an annular dieformed wire mesh seal backup element after the first dieforming operation.
Figure 6:
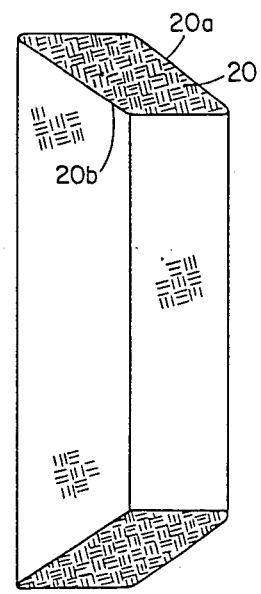
FIG. 6 is a sectional view showing the backup element of FIG. 5 after the second dieforming operation.

In accordance with this invention, the seal backup elements 20 and 20' are each formed by double dieforming operations on a tube or stocking formed of knitted mesh metallic wire. While any metallic wire having resilient properties may be utilized, the corrosion resistance of stainless steel, nickel alloys, such as that sold under the trademark "INCONEL" and brass wire make these materials preferable. Referring to FIG. 5, the annular seal backup sleeve 20 or 20' as the case may be, is initially dieformed to a maximum dimension which is at least equal to, and preferably exceeds the diametrical dimension of the bore wall W of the conduit C within which the seal is to be attained. For ultimate benefits, the knitted wire mesh may be dieformed to substantially the configuration it assumes when the seal assembly is compressed. Obviously, the seal backup ring 20 cannot be assembled in the seal assembly and run into the conduit C with such external dimensions. In accordance with this invention, a second dieforming step, as illustrated in FIG. 6, is performed on the annular mesh seal backup element 20, or 20' as the case may be, to reduce the maximum diameter of such seal backup element to a diameter significantly less than the bore diameter of the wall W of the conduit C.

In both dieforming operations, the small diameter bore of the annular seal backup element 20, or 20' as the case may be, is maintained at a dimension equal or greater than the external diameter of the portion of seal mounting body 10a upon which the seal assembly is mounted. Thus, after the second dieforming operation, both seal annular seal backup elements 20 and 20' can be freely assembled on the seal support body and the entire assembly can be readily inserted within the bore walls W of the well conduit C.

The application of an axial compressive force to the seal assembly then deforms the seal backup elements 20 and 20' radially outwardly in the manner schematically indicated in FIG. 2, so that the external surfaces of such seal backup members intimately engage the bore wall W of the conduit C and effectively prevent extrusion of the elastomeric material of the seal element 25 between the backup elements and the bore wall. Such outward expansion and deformation of the backup seal elements 20 and 20' is accomplished with significantly less compressive force due to the preforming of such backup elements to an equal or larger maximum diameter than they will assume when expanded to engage the bore wall W of the conduit C. The reduction in axial compressive force is due to the elastic memory of the knitted wire from which the seal backup elements 20 and 20' are formed. Thus, such seal backup elements are expanded with less axial compressive force and hence those elements which apply the axial compressive force to the seal backup elements 20 and 20' may be reduced in size due to the reduced strength requirements imposed upon such elements to produce the desired expansion of the elastomeric seal 25 and the seal backup elements 20 and 20'.

Figure 3:
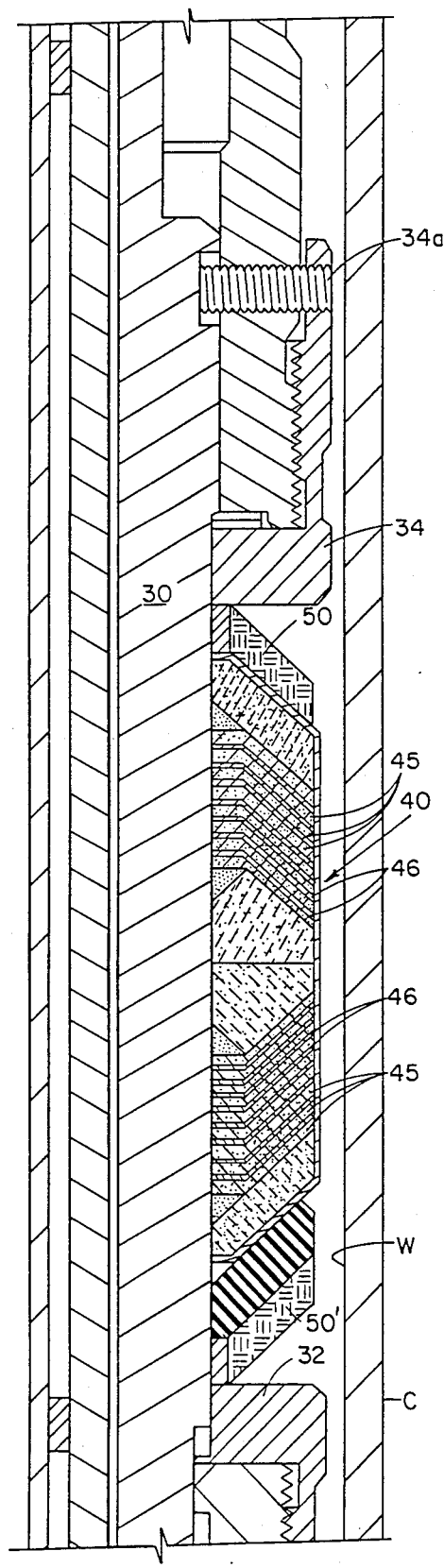
FIG. 3 is a schematic sectional view of a seal assembly utilizing a plurality of axially stacked, non-elastomeric sealing elements which are backed up on each axial end by an annular double dieformed mesh backup member embodying this invention.
Figure 4:
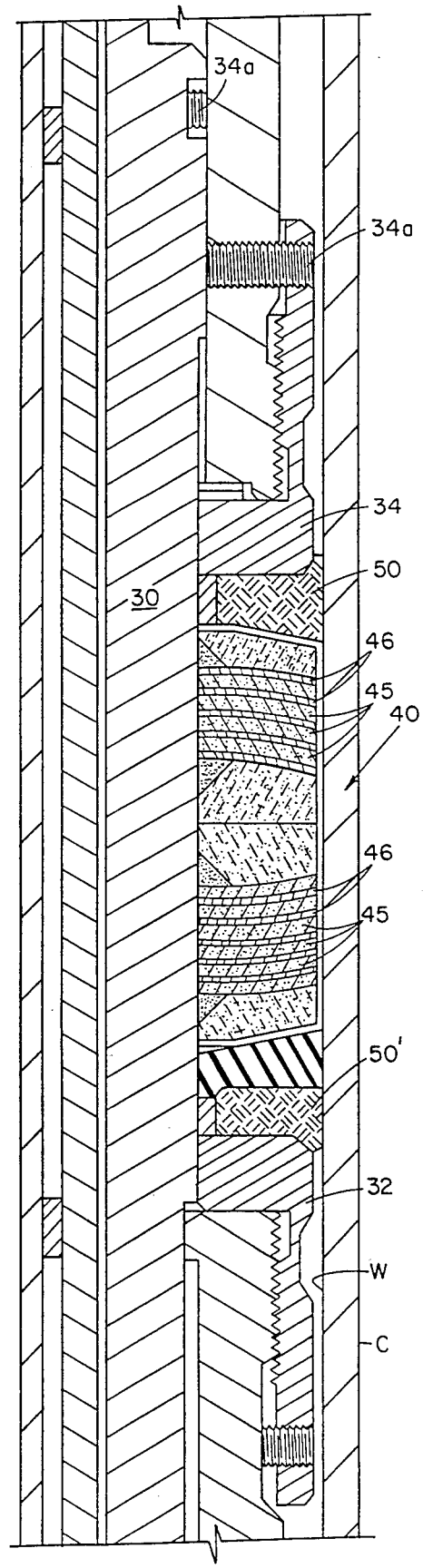
FIG. 4 is a view similar to FIG. 3 but showing the elements of the seal assembly in their expanded sealing positions.

Seal backup elements embodying this invention may be equally applied to seal assemblies employing an axial stack of separate sealing elements, and particularly nonelastic sealing elements. For example, FIGS. 3 and 4 illustrate a seal assembly employed in a high temperature well environment, such as a well wherein high pressure, high temperature steam is injected into one or more production formations to increase the viscocity of the hydrocarbons contained therein. The seal assembly 40 illustrated in FIGS. 3 and 4 is substantially identical to that described and claimed in co-pending application Ser. No. 811,093, filed Dec. 19, 1985 and assigned to the Assignee of the instant application, hence will not be described in detail. The primary difference is the fact that the knitted wire mesh seal backup elements 50 and 50', which are molded by a dieforming operation, are subjected to two such dieforming operations. In the first such operation, the maximum diameter of the seal backup element is formed to equal or preferably exceed the internal diameter of the bore W with which engagement is to be made, while the second dieforming operation reduces such maximum diameter to a dimension significantly less than the bore diameter to permit easy assemblage and insertion of the seal backup elements in the bore to be sealed.

The packing assembly comprises a seal mounting body 30 between a lower abutment sleeve 32 conventionally secured to the seal mounting body 30 and an upper abutment sleeve 34 which is secured by a shear pin 34a to the seal mounting body 30 for run-in purposes. Intermediate the shoulders 32a and 34a of the abutment sleeves 32 and 34, an axially stacked seal assemblage 40 is mounted. The detailed construction of the individual sealing elements 45 and dividers 46 incorporated in the axial stack 40 forms no part of the instant invention and is described in detail in the aforementioned co-pending application. The important fact is that each end of the seal assembly 40 is abutted by an upper seal backup ring 50 and a lower seal backup ring 50'. Both of these rings are of parallelogram cross sectional configuration and the rings differ from each other only in that the configuration of one is a reversed mirror image of the configuration of the other. Each of the seal backup rings 50 and 50' are formed by two molding or dieforming operations on a tubular sleeve or stocking formed from knitted wire mesh formed from corrosion resistant wire such as stainless steel, a nickel alloy sold under the trademark "INCONEL", or brass. In the first dieforming operation, the maximum diameter of the seal backup elements 50 and 50' is formed to equal or preferably exceed the diameter of the bore wall W of the wall conduit C. In a second molding or dieforming operation, the backup elements 50 and 50' are reduced in maximum diameter to the level schematically indicated in FIG. 3 which is significantly less than the diameter of the bore wall W. Thus, the annular backup rings 50 and 50' may be readily incorporated in the seal assembly and will transmit axial compression forces applied by relative movement between the abutment sleeves 32 and 34 to the individual sealing elements 45.

In the specific seal configuration shown in the drawings and described in the aforementioned co-pending application, the seal body 30 and abutment sleeve 34 is moved upwardly relative to the abutment sleeve 32 and, as the two radial shoulders 32a and 34a approach each other, axial compressive forces are applied to the seal backup members 50 and 50' and hence to the stacked seal assembly 40 so that all such elements are expanded radially outwardly to assume the positions and configurations shown in FIG. 4, wherein the nonelastic sealing elements 45 of the seal stack 40 are in sealing engagement with the bore wall W of the surrounding well conduit C as are the seal backup elements 50 and 50'. Hence, extrusion of the seal elements is effectively prevented.

The amount of axial compressive force required to achieve the sealed relationship illustrated in FIG. 4 is substantially reduced due to the double dieforming operation performed on the annular knitted mesh seal backup elements 50 and 50'.

It will therefore be apparent to those skilled in the art that the method of fabricating knitted wire mesh backup sealing elements embodying this invention results in a significant reduction in the compressive forces required to expand such seal backup elements into close contacting relationship with the bore wall of the conduit with which the sealing assembly is to be engaged. Furthermore, such seal backup members may be utilized with a single elastomeric seal or an axial stack of either elastomeric or non-elastic sealing elements with equal success.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A seal assembly for sealing the the annulus between two telescopically related, concentric tubular conduits of a subterranean well, said seal assembly comprising: at least one pressure deformable annular sealing element; an anti-extrusion element disposed axially adjacent to said annular sealing element; and means for applying an axial compressive force to said annular sealing element through said anti-extrusion element thereby radially expanding said anti-extrusion element into snug engagement with the surfaces defining said annulus; said anti-extrusion element being formed from an annular mass of metallic wire mesh initially molded to a maximum diametrical dimension at least equal to the large diameter of said annulus, and subsequently being remolded to a dimension permitting the free assemblage of said anti-extrusion element with said annulus, such that the initial molding and remolding process reduces the axial compressive force necessary to radially expand said anti-extrusion element.

2. A seal assembly for sealing the annulus between two telescopically related, concentric tubular conduits of a subterranean well, said seal assembly comprising: an axial stack of pressure deformable annular sealing elements; an anti-extrusion ring disposed axially adjacent to each end of said stack of annular sealing elements; and means for applying an axial compressive force to said stack of annular sealing elements through said anti-extrusion rings, thereby radially expanding both said anti-extrusion rings and said annular sealing elements, said anti-extrusion ring being formed from an annular mass of metallic wire mesh initially molded to a maximum diametrical dimension at least equal to the large diameter of said annulus, and subsequently being remolded to a dimension permitting the free assemblage of said anti-extrusion ring within said annulus, such that the initial molding and remolding process reduces the axial compressive force necessary to radially expand said anti-extrusion element.

3. The improvement of claim 1 wherein said wire mesh is formed from stainless steel wire.

4. The improvement of claim 1 wherein said wire mesh is formed from a nickel alloy wire.

5. The improvement of claim 1 wherein said wire mesh is formed from brass wire.

6. The method of forming an anti-extrusion ring for a deformable seal disposed in the annulus between two concentrically telescoped conduits, comprising the steps of:
  1. forming an annular mass of metallic wire mesh;
  2. initially molding said annular mass of metallic wire mesh to an internal radial dimension not less than the small diameter of said annulus and an external diameter at least equal to the large diameter of said annulus; and
  3. subjecting said annular mass to a second molding operation to reduce its large diameter to less than the large diameter of said annulus, thereby permitting the free insertion of said annular mass into said annulus and the ready expansion thereof by an applied axial compressive force to snugly engage the walls of said annulus.

7. The method of claim 6 wherein said wire mesh is formed from stainless steel wire.

8. The method of claim 6 wherein said wire mesh is formed from a nickel alloy wire.

9. The method of claim 6 wherein said wire mesh is formed from brass wire.

10. The seal assembly as defined in claim 1, wherein the annular mass of metallic wire mesh is remolded to a maximum diametrical dimension substantially less than the large diameter of said annulus, while the inner diametrical dimension remains substantially constant during the remolding process.

11. The seal assembly as defined in claim 2, wherein the inner diametrical dimension of the annular mass of metallic wire mesh is initially molded to a dimension equal to or greater than the inner diameter of said annulus.

12. The method of claim 6, wherein said first molding step comprises molding the annular mass of metallic wire mesh to a configuration substantially similar to the configuration of the anti-extrusion ring when expanded by the application of the axial compressive force.--

* * * * *